US010605063B2

(12) United States Patent
Berle et al.

(10) Patent No.: US 10,605,063 B2
(45) Date of Patent: Mar. 31, 2020

(54) OIL FILTRATION SYSTEM FOR SUBSEA OIL-FILLED MACHINES

(71) Applicant: Framo Engineering AS, Bergen (NO)

(72) Inventors: Atle Karstein Berle, Bergen (NO); Raymond Rogne, Bergen (NO)

(73) Assignee: Framo Engineering AS, Bergen (NO)

( * ) Notice: Subject to any disclaimer, the term of this patent is extended or adjusted under 35 U.S.C. 154(b) by 813 days.

(21) Appl. No.: 14/784,863

(22) PCT Filed: Apr. 15, 2014

(86) PCT No.: PCT/US2014/034107
§ 371 (c)(1),
(2) Date: Oct. 15, 2015

(87) PCT Pub. No.: WO2014/172324
PCT Pub. Date: Oct. 23, 2014

(65) Prior Publication Data
US 2016/0076353 A1 Mar. 17, 2016

Related U.S. Application Data

(60) Provisional application No. 61/812,297, filed on Apr. 16, 2013.

(51) Int. Cl.
*B01D 29/56* (2006.01)
*B01D 35/02* (2006.01)
(Continued)

(52) U.S. Cl.
CPC .............. *E21B 43/36* (2013.01); *B01D 29/56* (2013.01); *B01D 35/02* (2013.01); *B01D 35/147* (2013.01);
(Continued)

(58) Field of Classification Search
CPC ...... B01D 29/56; B01D 53/02; B01D 53/147; B01D 53/18; B01D 36/003; B01D 61/366;
(Continued)

(56) References Cited

U.S. PATENT DOCUMENTS 3,839,176 A 10/1974 McCoy et al.
5,044,440 A 9/1991 Stinessen et al.
(Continued)

FOREIGN PATENT DOCUMENTS

WO 2011049685 A2 4/2011
WO 2011/161516 A1 12/2011

OTHER PUBLICATIONS

International Patent Application No. PCT/US2014/034107 International Search Report and Written Opinion dated Aug. 27, 2014 (8 pages).
(Continued)

*Primary Examiner* — Pranav N Patel
(74) *Attorney, Agent, or Firm* — Conley Rose, P.C.

(57) ABSTRACT

A subsea oil filtration system is described that forms a closed circuit with and is mounted on or connected to a subsea rotating machine. According to some embodiments, the oil filtration system enables the removal of dirt and/or water that has entered the barrier fluid/oil system whether it comes from the Hydraulic Pressure Unit (HPU), from the umbilical or from other parts of the oil contained lubrication and/or barrier fluid systems.

25 Claims, 11 Drawing Sheets

(51) Int. Cl.
| | | |
|---|---|---|
| *B01D 36/00* | (2006.01) | |
| *B03C 1/30* | (2006.01) | |
| *E21B 43/36* | (2006.01) | |
| *F04D 29/063* | (2006.01) | |
| *F04D 13/10* | (2006.01) | |
| *F04D 25/06* | (2006.01) | |
| *F04D 29/06* | (2006.01) | |
| *F04D 13/08* | (2006.01) | |
| *F04D 29/70* | (2006.01) | |
| *H02K 9/19* | (2006.01) | |
| *F04D 13/06* | (2006.01) | |
| *H02K 5/132* | (2006.01) | |
| *B01D 35/147* | (2006.01) | |
| *B01D 35/18* | (2006.01) | |
| *B01D 61/36* | (2006.01) | |

(52) U.S. Cl.
CPC .......... *B01D 35/18* (2013.01); *B01D 36/003* (2013.01); *B01D 61/366* (2013.01); *B03C 1/30* (2013.01); *F04D 13/0653* (2013.01); *F04D 13/086* (2013.01); *F04D 13/10* (2013.01); *F04D 25/0686* (2013.01); *F04D 29/061* (2013.01); *F04D 29/063* (2013.01); *F04D 29/701* (2013.01); *F04D 29/708* (2013.01); *H02K 5/132* (2013.01); *H02K 9/19* (2013.01)

(58) Field of Classification Search
CPC ............ B01D 17/0045; B01D 17/0214; B01D 17/06; B01D 17/0217; B01D 17/047; B01D 19/0036; B01D 24/10; E21B 43/36; F04D 13/0653; F04D 13/086; F04D 13/10; F04D 25/068; F04D 29/061; F04D 29/70; H02K 5/132; H02K 9/19
See application file for complete search history.

(56) References Cited

U.S. PATENT DOCUMENTS

| | | | | |
|---|---|---|---|---|
| 5,868,939 | A * | 2/1999 | Oder .................. | B01D 17/0214 210/695 |
| 2010/0129237 | A1 | 5/2010 | Eide et al. | |
| 2010/0150740 | A1 | 6/2010 | Veland | |
| 2011/0072975 | A1 | 3/2011 | Aarebrot et al. | |
| 2011/0097216 | A1* | 4/2011 | Kuzdzal ............. | F04B 39/0207 417/53 |
| 2011/0097223 | A1* | 4/2011 | Verichev ................ | H02K 5/132 417/374 |
| 2011/0120959 | A1 | 5/2011 | Levitt et al. | |
| 2011/0139625 | A1 | 6/2011 | Arntzen et al. | |
| 2011/0203982 | A1* | 8/2011 | Braunheim .......... | B01D 29/114 210/171 |
| 2011/0210003 | A1* | 9/2011 | Eriksen ............. | B01D 17/0211 204/555 |
| 2012/0145609 | A1 | 6/2012 | Caffell et al. | |
| 2012/0282116 | A1 | 11/2012 | Tonnessen | |
| 2012/0292252 | A1* | 11/2012 | Chase .................. | B01D 46/003 210/634 |

OTHER PUBLICATIONS

Extended European Search Report dated Oct. 6, 2016, for European Application No. 14784908.7 (9 pages).
Examination Report dated May 2, 2017, for European Application No. 14784908.7 (5 pages).

* cited by examiner

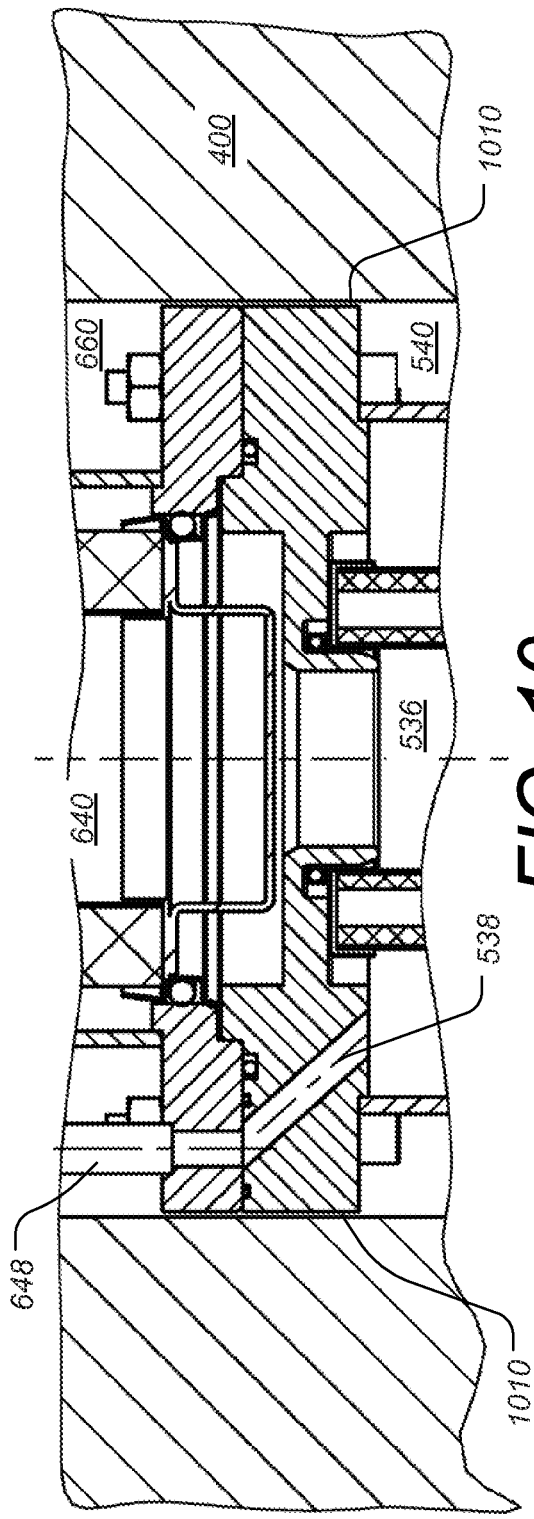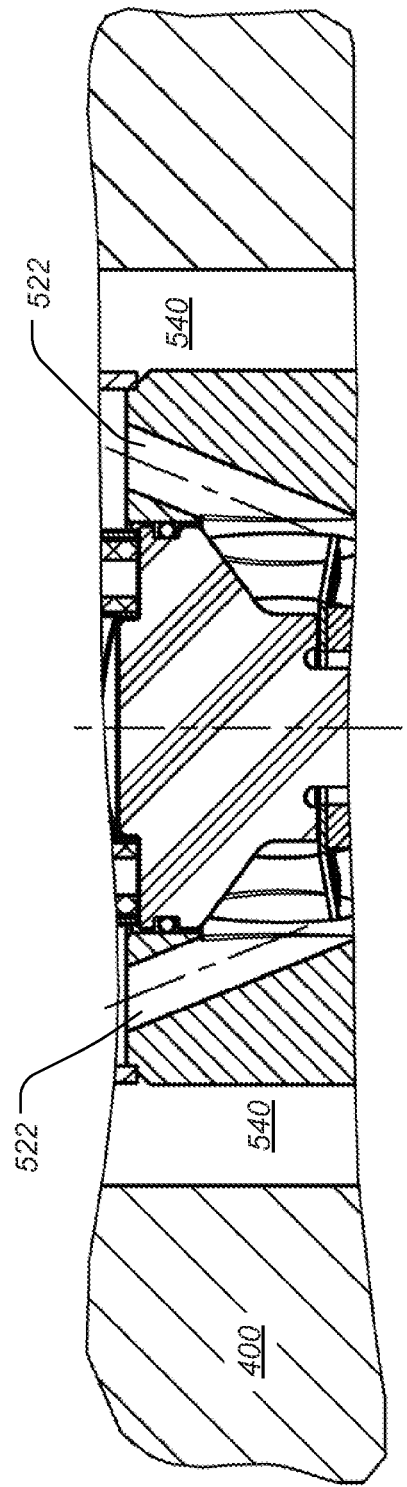

OIL FILTRATION SYSTEM FOR SUBSEA OIL-FILLED MACHINES

CROSS-REFERENCE TO RELATED APPLICATIONS

This patent application claims the benefit of: U.S. Prov. Ser. No. 61/812,297 filed Apr. 16, 2013, and entitled "An Oil Filtration System for Electric Machines;" and International Application Ser. No. PCT/US2014/034107, filed Apr. 15, 2014, and entitled "An Oil Filtration System For Subsea Oil-Filled Machines," the contents of each being incorporated herein by reference in their entireties for all purposes.

TECHNICAL FIELD

The present disclosure relates to oil filtration systems for subsea machines. More particularly, the present disclosure relates to subsea systems for separating contaminants, for example, water and particulate matter from barrier fluid used in subsea rotating machines, such as a subsea electric motor combined with a subsea pump and/or compressor.

BACKGROUND

A wide variety of systems are known for producing fluids of economic interest from subterranean geological formations. In formations providing sufficient pressure to force the fluids to the earth's surface, the fluids may be collected and processed without the use of artificial lifting systems. However, where well pressures are insufficient to raise fluids to the collection point, artificial means are typically employed, such as pumping systems. These pumping systems might be located downhole or subsea.

The particular configurations of an artificial lift pumping systems may vary widely depending upon the well or subsea conditions, the geological formations present, and/or the desired completion approach. In general, though, such systems typically include an electric motor driven by power supplied from the earth's surface. The motor is coupled to a pump (or a compressor), which draws wellbore fluids from a production horizon or from subsea ground and imparts sufficient head to force the fluids to the collection point. Such systems may include additional components especially adapted for the particular wellbore fluids or mix of fluids, including gas/oil separators, oil/water separators, water injection pumps, and so forth.

The operation of these pumps (and/or compressors) can be impaired if/when impurities (e.g. sand particles) and/or ingression of water and/or seawater appears in the barrier fluid. Under such circumstances, the barrier fluid/oil degradation can cause increased pump (and/or compressor) wear and/or motor insulation problems, and can lead to increased equipment downtime.

Within known systems, the subsea pumps/compressors are connected to the surface via an umbilical from a topside production unit. The barrier fluid can be cleaned by filtering/ water separation systems, monitored and checked before it is pumped from a Hydraulic Pressure Unit (HPU) through the umbilical and into the pump/compressor module.

However, the barrier fluid can be contaminated after being pumped from the HPU. For example, loose particles may be present in the umbilical that cannot be suitably cleaned; particles can be generated from various sources such as worn umbilical tubing; water/seawater ingression can occur at various locations within the system; particles such as dust and/or lacquer can enter the electric motor; particles can be loosened from the inside surface of the electric motor stator, rotor or cable terminations; and particles can be generated from rotodynamic wear.

Barrier fluid contamination can lead to problems in the motor insulation and negatively affect the overall performance of the barrier fluid in the pump and/or compressor. For example, water ingress can degrade properties of the barrier fluid such as in load carrying ability, corrosion protection ability, and lubrication ability. Particles in the barrier fluid can wear the internal surfaces causing more particles, which can accelerates the wear process of bearings, circulation impeller, coupling and dynamic seals.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An object, according to some embodiments, is to provide an improved oil filtration system for subsea electric motors, pumps, and/or compressors, or for oil used for cooling and/or lubricating a subsea rotating machine.

According to some embodiments, an oil filtration system is described that forms a closed circuit mounted on or connected to a subsea rotating machine. According to some embodiments, an oil filtration system is described that forms a closed circuit mounted in parallel with an oil cooling system for a subsea electrical motor. According to some embodiments, an oil filtration system is described that enables the removal of dirt and/or water that has entered the barrier fluid/oil system whether it comes from the HPU, from the umbilical or from other parts of the oil contained lubrication and/or barrier fluid systems.

According to some embodiments, a subsea system is described that includes: an electric motor filled with a barrier fluid that provides lubrication and a barrier between portions of the electric motor and surrounding seawater; a rotating fluid processor (e.g. a pump or compressor) driven by the electric motor and lubricated by the barrier fluid; and a subsea barrier fluid filtration system, including one or more separation components configured to separate contaminants (such as water and/or particles) from the barrier fluid by circulating a portion of the barrier fluid through the one or more separation components. According to some embodiments, solid particles are separated by flowing at least a portion of the barrier fluid through a primary particle filtration medium. One or more bypass conduits can be configured to allow at least a portion of the barrier fluid to bypass the primary filtration medium. A secondary separation unit can be configured to provide contaminant separation in cases when the primary filtration medium is partially or completely clogged. The secondary separation unit can be configured to separate water contaminants by allowing for gravity collection of condensed water, and/or to separate particle contaminants by gravity separation of the particle contaminants. According to some embodiments, the filtration system is configured to allow at least 2% of fluid flowing through the filtration system to flow through the bypass conduit(s) even when the primary filtration medium is clean.

According to some embodiments, the filtration system further includes: a secondary particle filtration medium downstream of the primary filtration medium; and a second bypass conduit configured to allow at least a portion of the barrier fluid to bypass the secondary filtration medium. The filtration system can include a water coalescer configured to mechanically coalesce water droplets in the barrier fluid, and a water separation membrane configured to block coalesced water droplets from passing through the membrane. The filtration system can also include a water collection volume configured to store water separated from the barrier fluid. According to some embodiments, the filtration system can include a magnetic separation unit configured to extract at least magnetically susceptible material from the barrier fluid. According to some embodiments, the subsea system can also include a barrier fluid cooling system configured to cool at least a portion of the barrier fluid, and the cooling system and the filtration system can be configured in parallel with each other.

According to some embodiments, a method is described for processing a fluid in a subsea location. The method includes: powering a subsea electric motor; circulating a barrier fluid through the electric motor to lubricate and insulate the motor and provide a barrier between portions of the electric motor and surrounding seawater; driving a subsea rotating fluid processor (e.g. pump or compressor) with the subsea motor thereby processing the process fluid; and filtering the barrier fluid using a subsea barrier fluid filtration system by circulating at least a portion of the barrier fluid through one or more separation components, thereby removing contaminants from the barrier fluid.

According to some embodiments, the barrier fluid can flow through both primary and secondary bypass conduits configured to bypass primary and secondary filtration media respectively, and a secondary separation unit is used to separate contaminants (e.g. water and/or particles) from the barrier fluid in cases when the primary and secondary filtration media are partially or completely clogged.

According to some embodiments, an ROV can be deployed to either install or remove the filtration system, or to remove separated water from the filtration system.

According to some embodiments, a subsea system is described for processing a fluid that includes: a subsea machine at least partially filled with a barrier fluid that provides lubrication and a barrier between portions of the electric motor and surrounding seawater; and a subsea barrier fluid filtration system including one or more separation components configured to separate contaminants from the barrier fluid by circulating a portion of the barrier fluid through the one or more separation components. According to some embodiments, the subsea machine can be a non-electrical machine such as a mechanical gearbox.

As used herein, the term "water" refers to any aqueous solution and includes, for example, seawater as well as other aqueous matter that may contaminate an oil solution, such as an oil-based barrier fluid.

BRIEF DESCRIPTION OF THE DRAWINGS

The subject disclosure is further described in the detailed description which follows, in reference to the noted plurality of drawings by way of non-limiting examples of embodiments of the subject disclosure, in which like reference numerals represent similar parts throughout the several views of the drawings, and wherein:

FIGS. 9, 10 and 11 are cross section views illustrating further details of a subsea barrier fluid filtration system, according to some embodiments.

DETAILED DESCRIPTION

The particulars shown herein are by way of example, and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details of the subject disclosure in more detail than is necessary for the fundamental understanding of the subject disclosure, the description taken with the drawings making apparent to those skilled in the art how the several forms of the subject disclosure may be embodied in practice. Further, like reference numbers and designations in the various drawings indicate like elements. Pumps can be understood to comprise any compressor systems.

Figure 1:
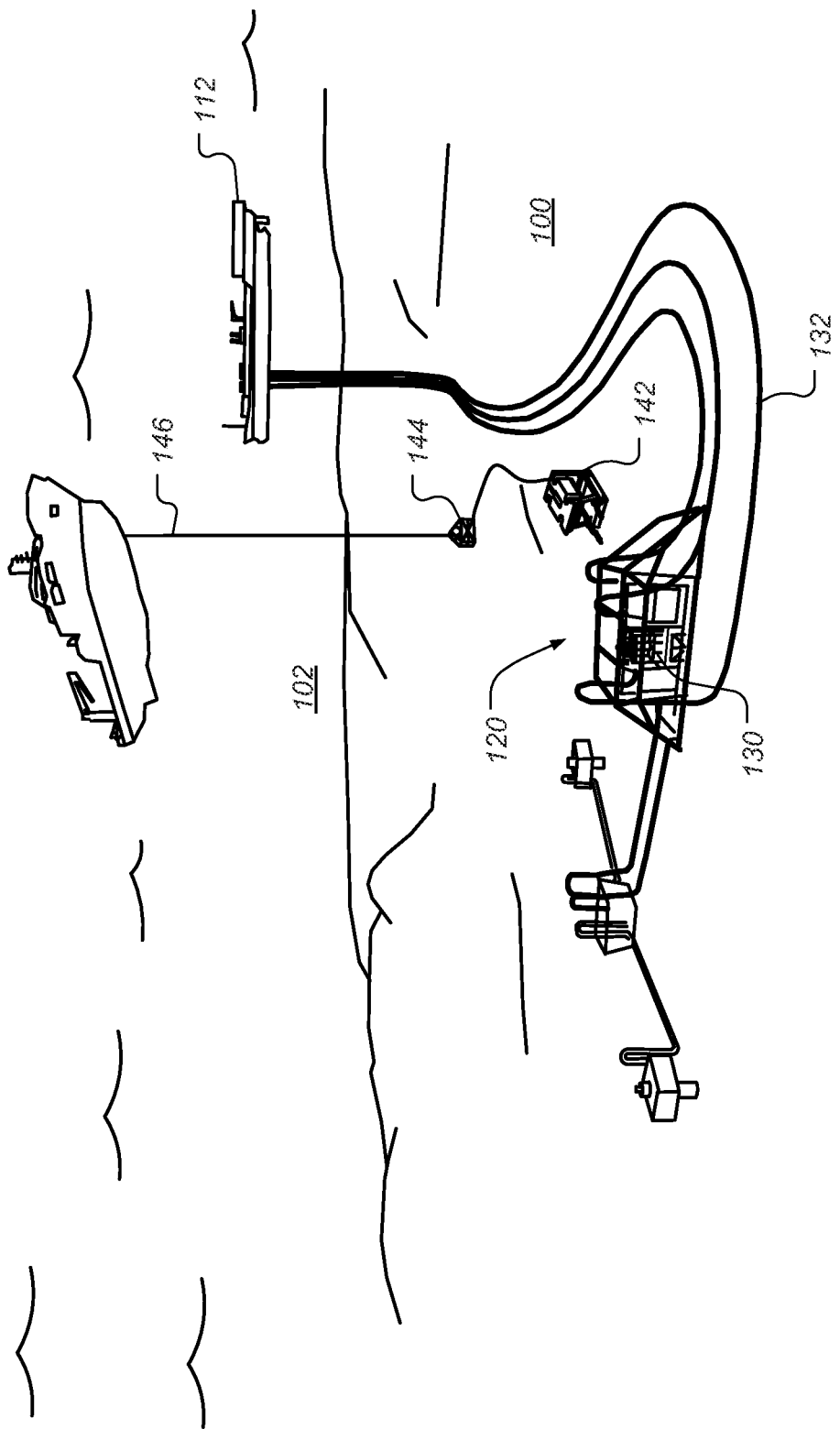
FIG. 1 is a diagram illustrating a subsea environment in which a subsea filtration system is deployed, according to some embodiments.

FIG. 1 is a diagram illustrating a subsea environment in which a subsea filtration system is deployed, according to some embodiments. On sea floor 100 a subsea station 120 is shown which is downstream of several wellheads being used, for example, to produce hydrocarbon-bearing fluid from a subterranean rock formation. Subsea station 120 includes a subsea pump unit or subsea compressor unit 130. The subsea station 120 is connected to one or more umbilical cables, such as umbilical 132. The umbilicals in this case are being run from a floating production, storage and offloading unit (FPSO) 112 through seawater 102, along sea floor 100 and to station 120. In other cases, the umbilicals may be run from some other surface facility such as a platform, or a shore-based facility. In addition to pump/compressor unit 130, the station 120 can include various other types of subsea equipment. The umbilical 132 is used to supply barrier fluid for use in the subsea pump or compressor. Umbilical 132 also provides electrical power to station 120. According to some embodiments, the umbilicals also provide other functionality such as: data transmission (e.g. control signals from the surface to the station, as well as data from the station to the surface); and energy to the station in other forms (e.g. hydraulic). Also visible in FIG. 1 is ROV 142, tethered using main lift umbilical 146 and tether management system 144.

In electrical motor systems such as used for boosting process fluids issuing from underground formations, such a pump/compressor 130 in station 120, the motor is filled with pressurized oil. The oil has several functions, including acting as a barrier system towards the outside environment and the process fluids, as coolant for the electro motor, as insulation for high voltage (HV) systems and as a lubricant for the various bearings and the seals of the boosting system. The oil used for such purposes is referred to herein as barrier fluid, although in a particular application the barrier fluid can serve a subset of these or similar functions in the subsea environment.

Figure 2:
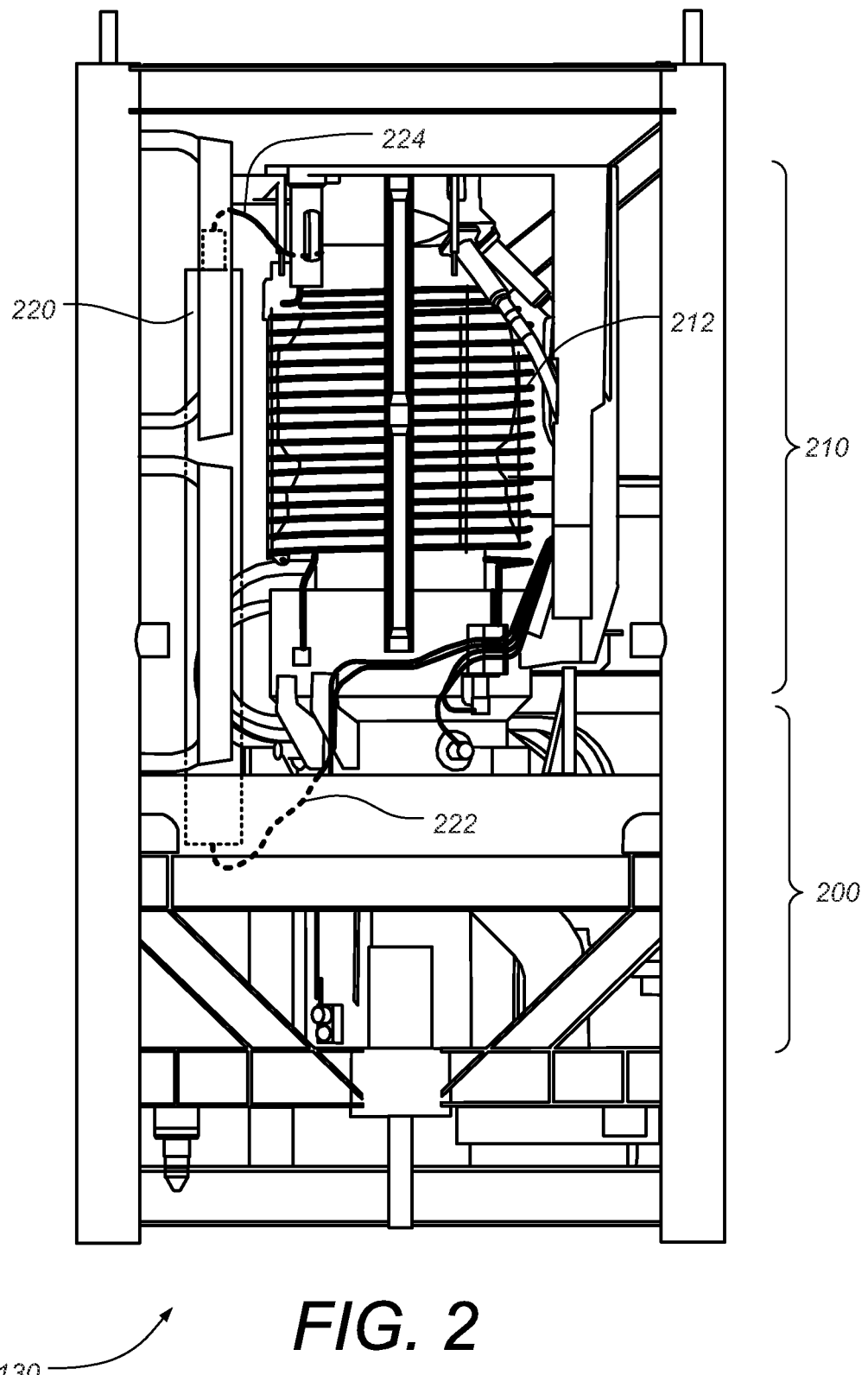
FIG. 2 is a diagram illustrating a subsea pump/compressor configured with a subsea barrier fluid filtration unit, according to some embodiments.

FIG. 2 is a diagram illustrating a subsea pump/compressor configured with a subsea barrier fluid filtration unit, according to some embodiments. Subsea pump/compressor unit 130 includes a subsea pump module 200 driven by a subsea motor 210 and is equipped with a subsea filtration system 220. According to some embodiments, subsea motor 210 is an oil-filled motor that is supplied with barrier fluid via an umbilical from the surface (as shown in FIG. 1). According to some embodiments, motor 210 includes a circumferentially arranged barrier fluid cooling coil 212. Note that although pump 130 has been described as a subsea pump herein, the methods and structures are equally applicable to subsea compressors. Accordingly, as used herein, the term pump also refers to compressors. Furthermore, it will be appreciated that the techniques described herein are also applicable to other types of subsea equipment that make use of barrier fluid and which would benefit from barrier fluid filtration.

According to some embodiments, the oil filtration system 220 is mounted on a subsea system or module, such as pump 130, and is connected thereto via hydraulic inlet conduit 222 and outlet conduit 224. According to some other embodiments, oil filtration system 220 may be mounted on a running tool or an ROV (such as ROV 142 in FIG. 1), and coupled via hydraulic connectors to an oil system where filtration is needed as an intervention activity. According to some embodiments, the described filtration system removes dirt and/or water that has ingressed into a barrier fluid circuit, whether it comes from the HPU, from the umbilical, or from other parts of the oil contained lubrication and/or barrier fluid systems.

According to some embodiments, filtration system 220 enables simultaneous filtration of particles and separation of water, while avoiding any blocking of the oil flow in the circuit.

According to some embodiments, the filtration system 220 is retractable, either as part of the system that needs oil filtration/separation, or on an auxiliary system for subsea intervention. According to some embodiments, the filtration system 220 is designed for high differential pressures. The filtration system 220 can be configured to separate and collect water. The filtration system 220 can also be configured for a significant subsea lifetime without filter cartridge replacements. According to some embodiments, the filtration system 220 can be configured with a high filtration capacity along with water separation capability.

Figure 3:
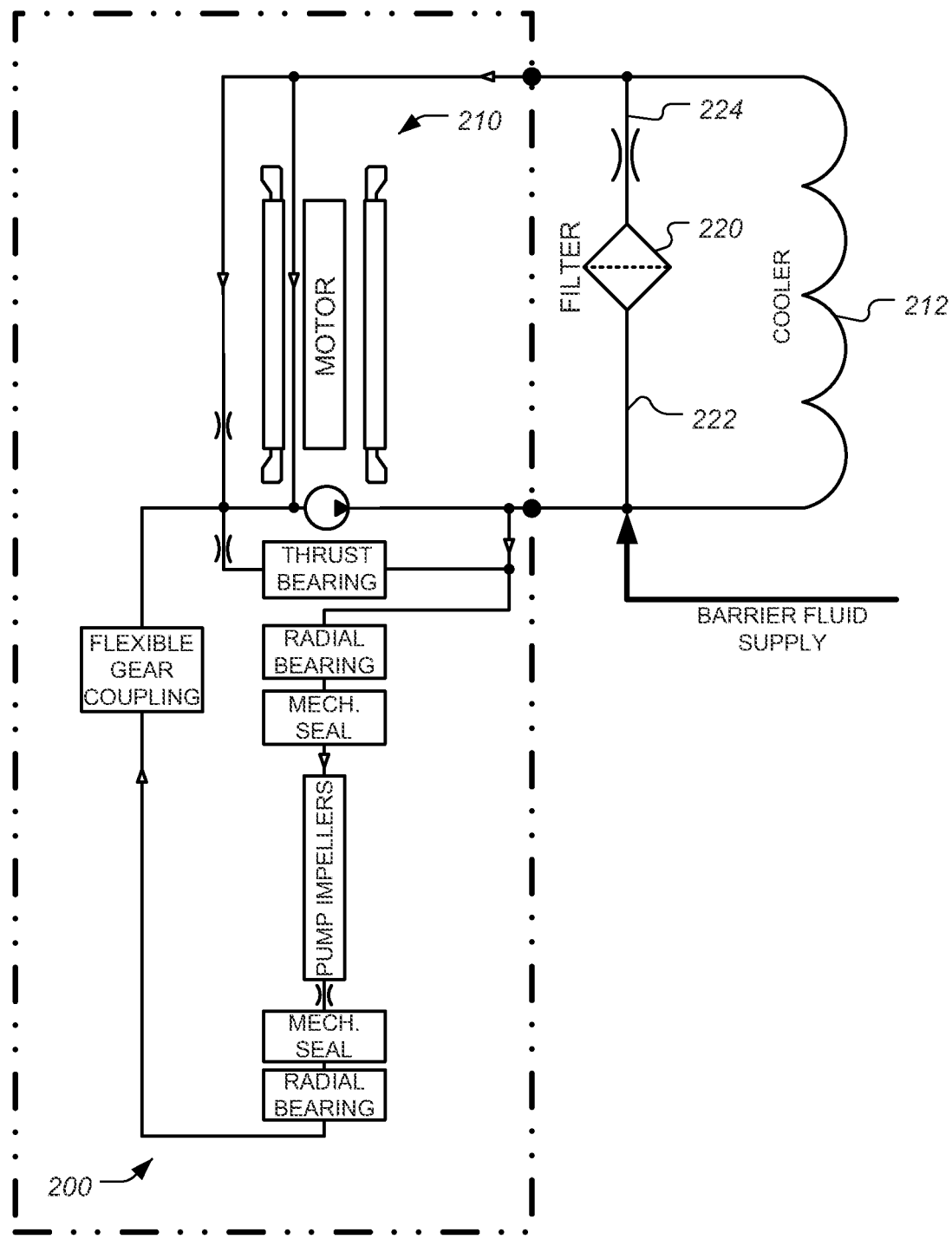
FIG. 3 is schematic diagram illustrating aspects of a subsea fluid processing system equipped with barrier fluid filtration system, according to some embodiments.

FIG. 3 is schematic diagram illustrating aspects of a subsea fluid processing system equipped with barrier fluid filtration system, according to some embodiments. As can be seen, according to some embodiments the filtration system 220 forms a closed circuit and configured in parallel with barrier fluid cooling system 212 for the subsea electric motor 210.

Figure 4:
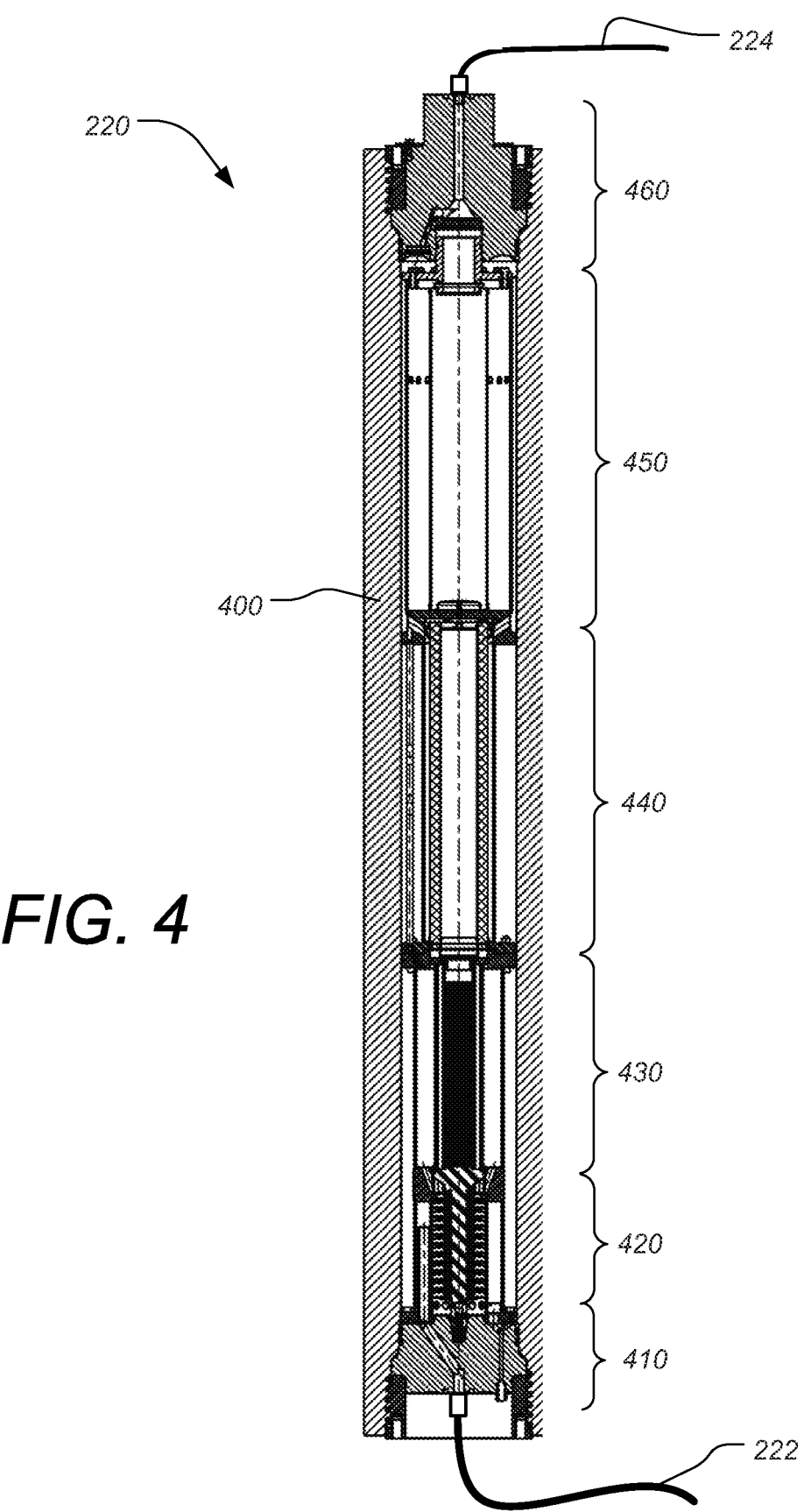
FIG. 4 is a cross section view illustrating aspects of a subsea barrier fluid filtration system, according to some embodiments.

FIG. 4 is a cross section view illustrating aspects of a subsea barrier fluid filtration system, according to some embodiments. The filtration system 220 as shown in FIG. 4 includes a main filter casing 400 that houses the filtration system inlet 410, magnetic particle filter 420, particle filter 430, coalescer 440, water separator 450 and filtration system outlet 460.

Figure 5:
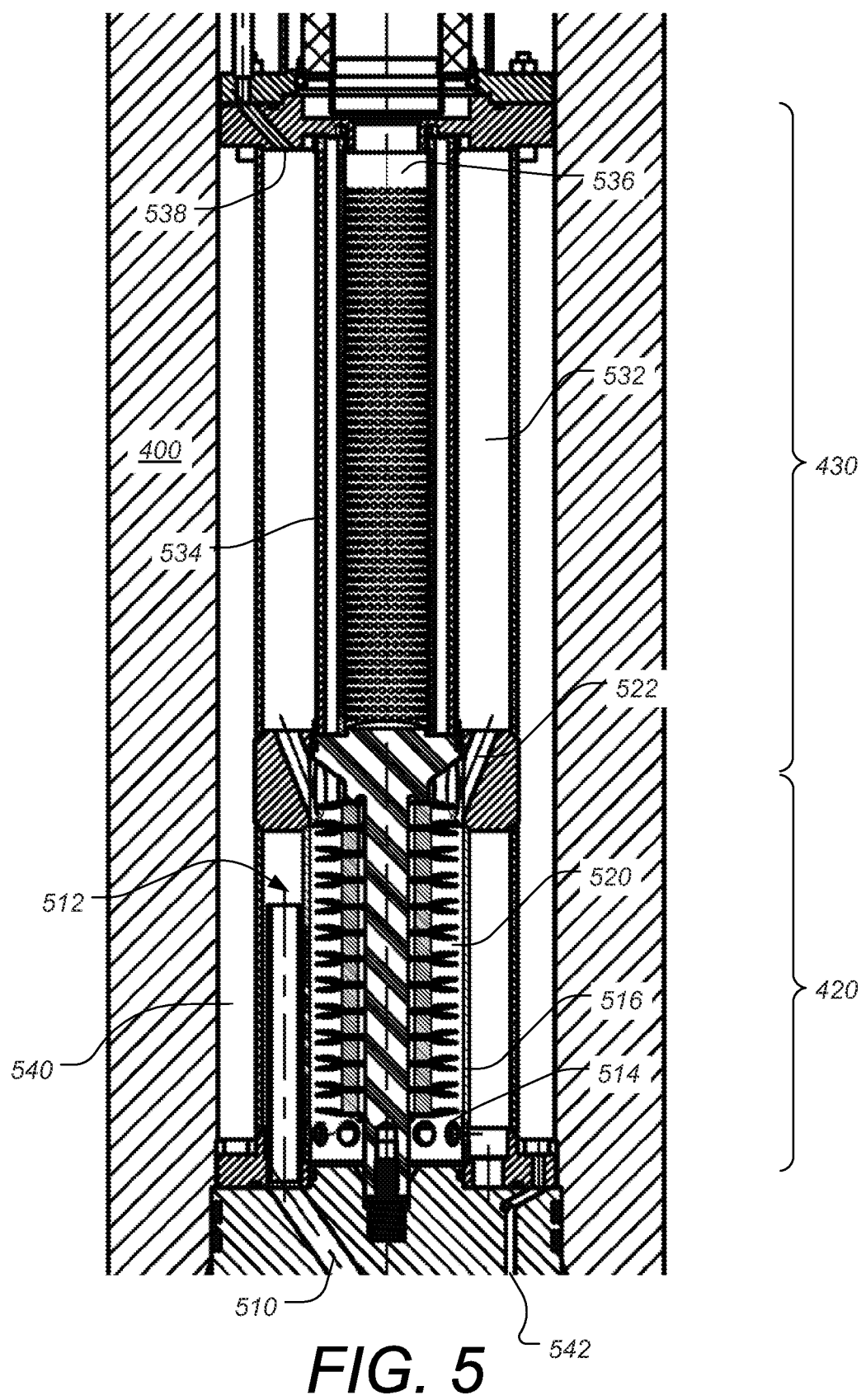
FIG. 5 is a cross section view illustrating aspects of a magnetic filter and particle filter for use with a subsea barrier fluid filtration system, according to some embodiments.

FIG. 5 is a cross section view illustrating aspects of a magnetic filter 420 and particle filter 430 for use with a subsea barrier fluid filtration system, according to some embodiments. The barrier fluid oil enters the filtration system 220 (shown e.g. in FIG. 2) via inlet 510. Inlet 510 leads to a labyrinth system 512, which prevents dirt and other particles from re-entering the subsea pump (or other machine) by back-flow. The oil is then led by multiple ports 514 in a magnetic filter housing 516 to the lower end of a magnetic particle filter section 520. In some examples, the distance between the magnetic filter housing 516 and the magnetic particle filter section 520 is made narrow so as to force the oil to pass within the magnetic filter channels. At the top end of magnetic particle filter 520, the main oil flow passes through ports 522 to an annular region 532 of particle filter 430. According to some embodiments, the filter 220 is configured such that during normal operation most of the barrier fluid oil passes from annular region 532 through particle filter membrane 534 and into the central conduit 536 while at the top of annular region 532 and a smaller amount of the barrier oil flows through the bypass port 538. According to some embodiments, particle filter membrane 534 is about a 12 micron filter. In cases where the particle membrane 534 is clogged, a larger amount of the flow goes through the bypass port 538. According to some embodiments, the filter 220 is configured such that when the particle filter membrane 534 is substantially clogged, approximately half of the regular flow of oil passes through the by-pass port 538. In one example, the filter 220 is designed such that about 22.4 liters/min flow through the bypass port 538 when the filter membrane 534 is clogged, while under normal un-clogged conditions the regular flow is about 40 liters/min through the filter 220.

According to some embodiments, the magnetic filter 420 is configured to remove abrasive magnetic particles down to sub-micron level. The design of the magnetic filter 420 has also been found to have "heterocoagulation" effects, meaning that it is also capable of removing some non-ferrous metals and particles such as Copper and Aluminum. According to some embodiments, most of the particles are removed by the magnetic filter 420 and the particle filter 430 is primarily intended to protect the downstream water coalescer 430.

Also visible in FIG. 5 is venting port 542 for water/oil canister 540, which is formed in the annular region outside housings of the magnetic and particle filters, 420 and 430, and inside the filter system casing 400. According to some embodiments, the venting port 542 can be connected to an ROV panel and/or other hydraulic connectors for drainage and/or fluid sampling.

Figure 6:
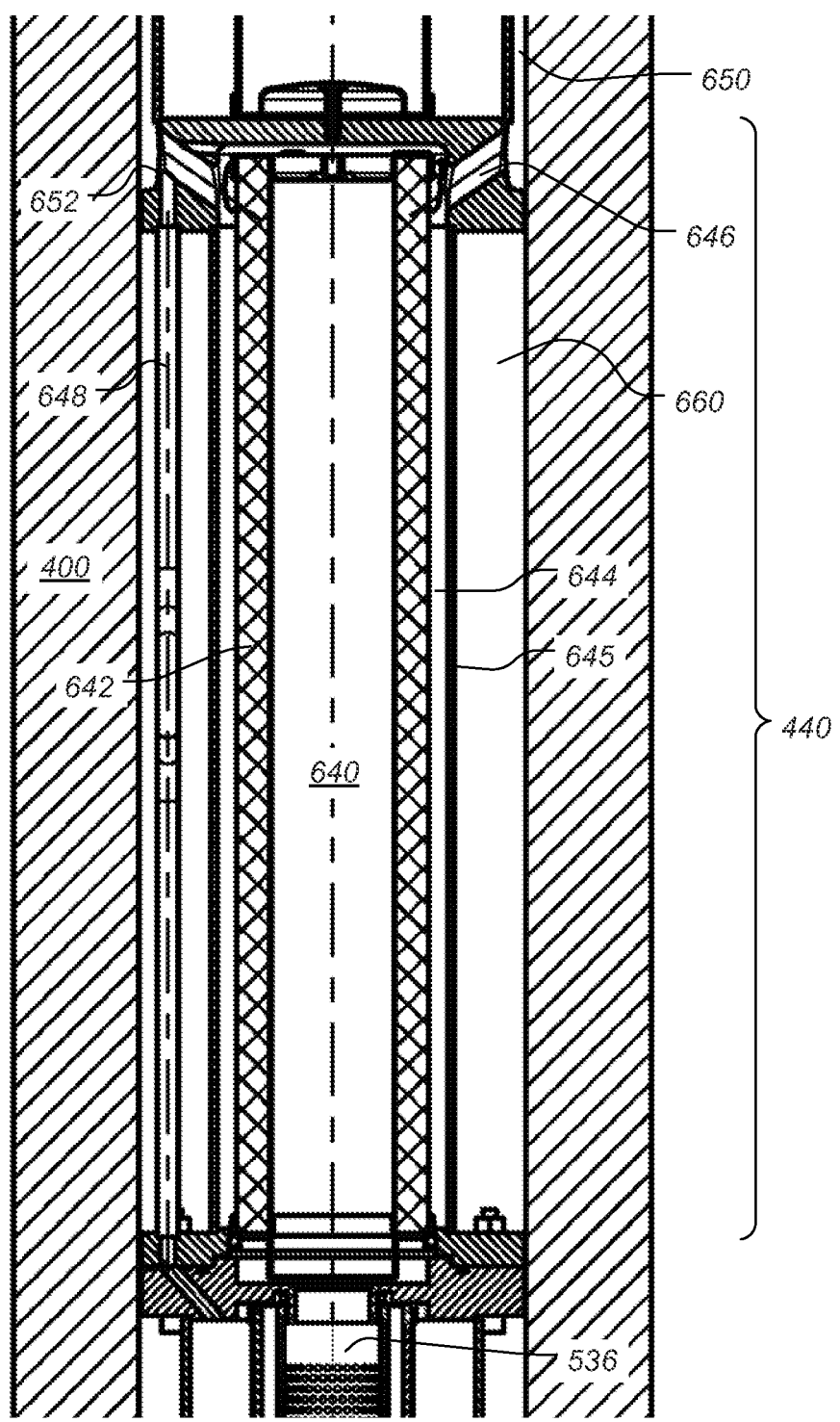
FIG. 6 is a cross section view illustrating aspects of water coalescer for use with a subsea barrier fluid filtration system, according to some embodiments.

FIG. 6 is a cross section view illustrating aspects of water coalescer 440 for use with a subsea barrier fluid filtration system, according to some embodiments. In cases where the particle filter membrane 534 is not clogged, the main flow passes through the central conduit 536 of the particle filter 430 (shown in FIG. 5) and into the central conduit 640 of coalescer 440. From conduit 640, the flow continues radially outwards through coalescer media 642 and into a coalescer annular region 644. The flow area may be made relatively small in order to maintain a minimum oil velocity to avoid water droplets settling on the inside of the coalescer housing 645. The coalescer media 642 acts to coalesce dispersed smaller water droplets into agglomerates of larger water droplets. Note that the water and oil are not separated in the coalecser 440; rather the fluid flows upwards through annular region 644, through ports 646 to the outer annular region 650 of separator 450. Also visible in FIG. 6 is an outer annular region 660, which is connected to water canister 540 via a small gap 1010 (e.g. 1 mm wide) at the lower outer edge of region 660 (visible in FIG. 10, infra). Within region 660 is a bypass conduit 648 that leads from bypass port 538 to bypass outlet port 652 where the bypass fluid joins the main fluid in outer annular region 650.

Figure 7:
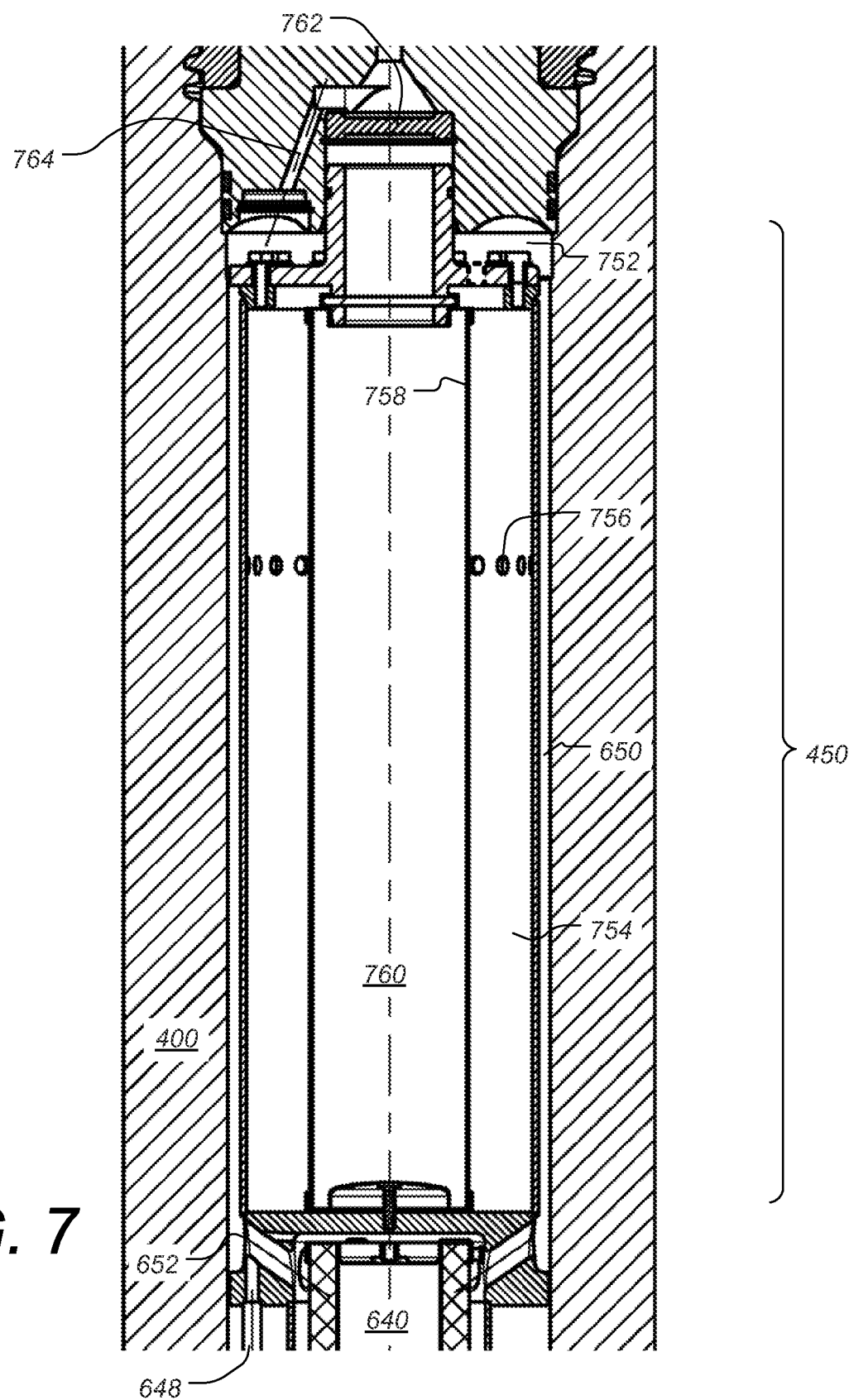
FIG. 7 is a cross section view illustrating aspects of a water separator for use with a subsea barrier fluid filtration system, according to some embodiments.

FIG. 7 is a cross section view illustrating aspects of a water separator 450 for use with a subsea barrier fluid filtration system, according to some embodiments. The fluid flows upwards along outer annular region 650 until it either passes into annular separator chamber 754 via primary axial holes from upper volume 752 (the axial holes are not visible in this cross section but their position is shown by the dotted lines) or through a plurality of secondary radial holes 756. According to some embodiments, some settling of water occurs on the inside wall of the filtration system casing 400 in outer annular region 650. This settled water then flows down along the inside of casing 400 into outer annular region 660 and water canister 540 by gravity via a small gap 1110 (e.g. 1 mm) that is visible in FIG. 11, infra. According to some embodiments, this path of the removed separated water advantageously is active when the main flow through filter 220 is clogged and fluid is instead mainly flowing through the bypass conduit 648. In such cases it has been found that upwards velocity of the fluid in outer annular region 650 is slow enough that substantial amounts of water can be removed along through collection on the inner wall of casing 400. The water collection effect on the inside wall of filter casing 400 has been found to be especially effective in cases where there is a substantial temperature differential between the ambient seawater temperature and the barrier fluid temperature. For example, it was found that at a barrier fluid temperature in the range of 0-80 deg. C. and an ambient sea water temperature of about 0-20 deg. C. the configuration shown in FIG. 7 was effective at separating water from the barrier fluid using the inner surface of casing 400 under low-velocity conditions.

Under normal conditions, the main flow of oil is from the annular separator chamber 754 through water filter media 758 and into central region 760. Water in the form of coalesced larger droplets is blocked by the water filter media 758, and then collects near the bottom of annular separator chamber 754 where it passes into region 660 via axial holes 1120, one of which is visible in FIG. 11. The oil in central region 760 flows upwards through a screen filter 762 and to outlet 460 and outlet conduit 224 (visible in FIG. 4). According to some embodiments, some oil can flow upwards from region 752 to outlet 460 bypassing screen filter 762 via a small bypass 764. This bypass 764 is useful to maintain flow (and therefore some amount of particle and water separation) in cases where the screen filter 762 and/or water filter media 758 is clogged. It has been found that in cases when the filter membrane 534, water filter media 758 and/or screen filter 762 are clogged, oil flowing slowly upward in outer annular region 650 has a velocity that is low enough that entrained water has time to settle along the inner wall of the filtration system casing 400, and fall back down to the water canister 540 below via gaps 1110, 1010 and region 660.

In normal operation, the water separation membrane 758 of the water filter 450 prevents water droplets in the oil to pass. The separated water flows downwards in separation chamber 754 through axial ports 1120 (in FIG. 11) into the water canister 540 via chamber 660 (which can also form part of the water canister). The oil flows through the water separation filter 758 into central region 760 and up through strainer (screen filter) 762 and returns to the electrical motor 210 (or other subsea system).

Figure 8:
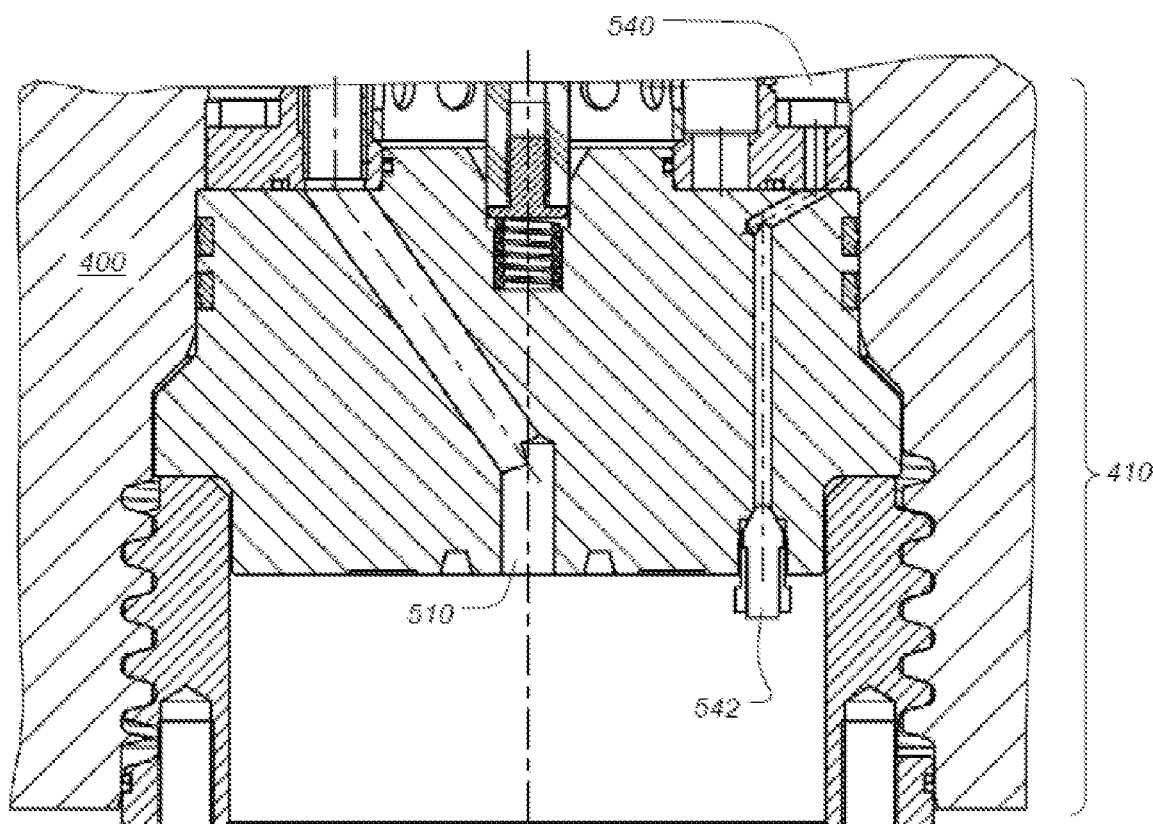
FIG. 8 is a cross section view illustrating further detail of an inlet of a subsea barrier fluid filtration system, according to some embodiments.

FIG. 8 is a cross section view illustrating further detail of an inlet 410 of a subsea barrier fluid filtration system, according to some embodiments. Visible in FIG. 8 is inlet 510 that leads to the magnetic particle filter 420 (shown in FIG. 5). According to some embodiments, the filtration system 220 is equipped with a connection port 542 at the bottom to allow for sampling of content from the water canister 540, or to empty all of the water content via intervention system and Remotely Operated Vehicle (ROV).

FIG. 9 is a cross section view illustrating further detail of a subsea barrier fluid filtration system, according to some embodiments. Visible in FIG. 9 are conduits 522 leading from magnetic particle filter 420 to particle filter 430.

FIG. 10 is a cross section view illustrating further detail of a subsea barrier fluid filtration system, according to some embodiments. Visible in FIG. 10 is bypass port 538 leading to bypass conduit 648 as well as annular gap 1010 that connects regions 660 and 540 (both forming part of the water canister, according to some embodiments).

Figure 11:
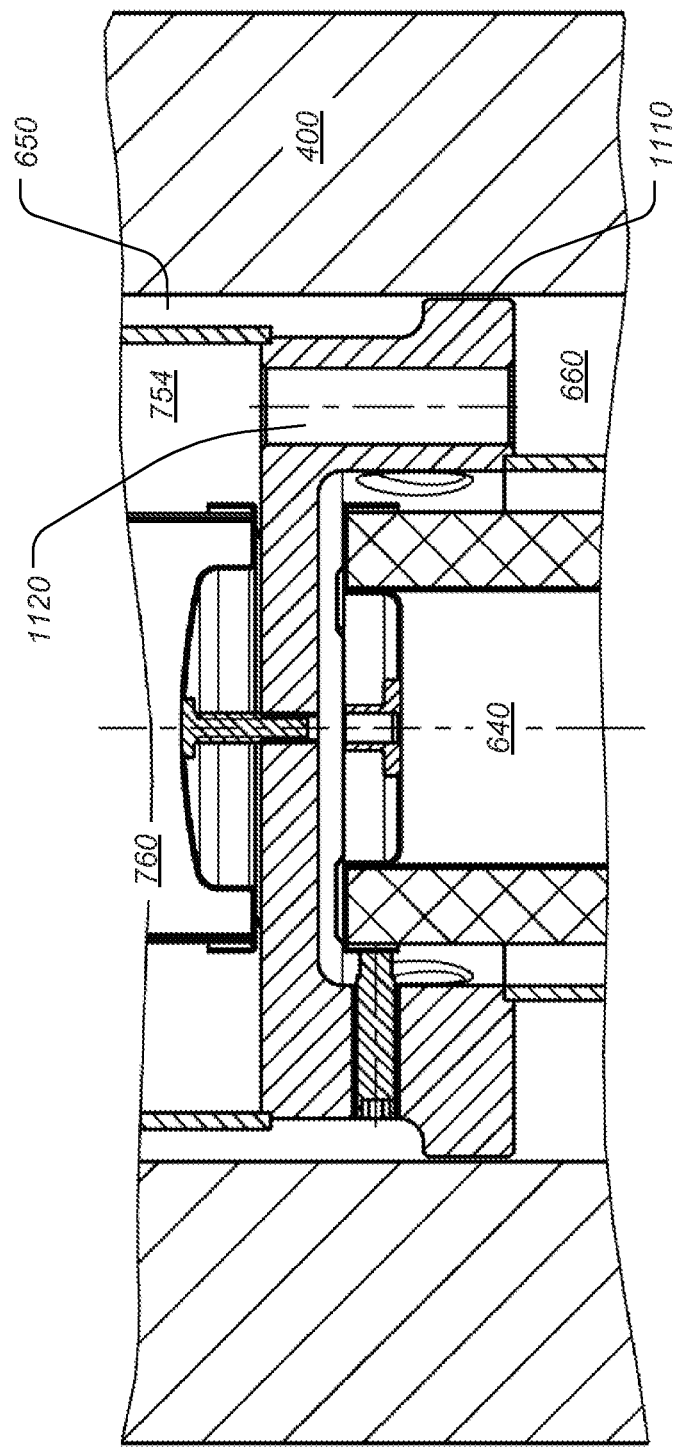

FIG. 11 is a cross section view illustrating further detail of a subsea barrier fluid filtration system, according to some embodiments. Visible in FIG. 11 is axial port 1120 that drains water from separation chamber 754 to region 660, as well as annular gap 1110 for draining water collected on the inner surface of filter casing wall 400 in outer annular region 650 to region 660.

Figure 12:
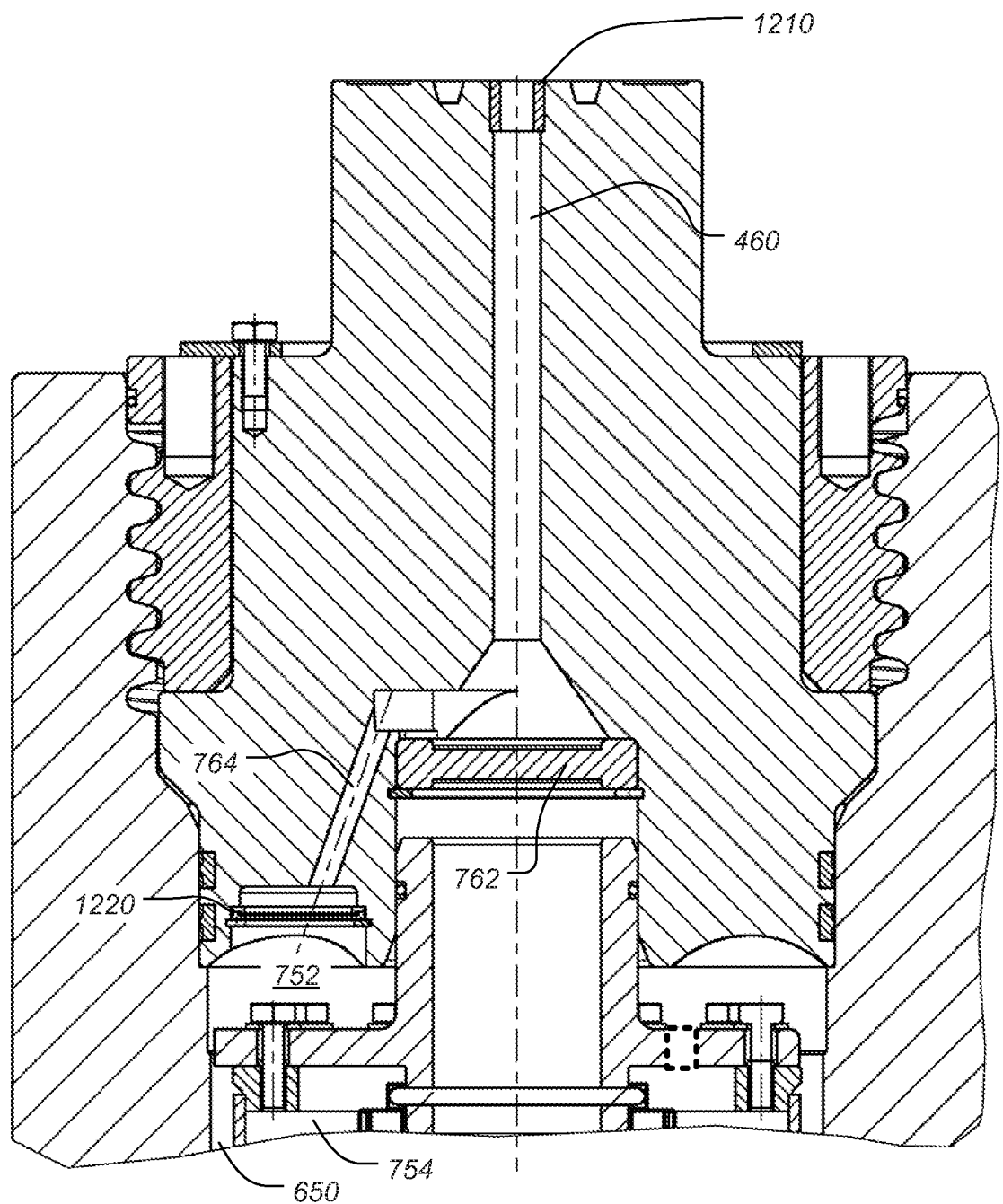
FIG. 12 is a cross section view illustrating further detail of an outlet of a subsea barrier fluid filtration system, according to some embodiments.

FIG. 12 is a cross section view illustrating further detail of an outlet of a subsea barrier fluid filtration system, according to some embodiments. Visible in FIG. 12 is bypass 764 that leads from region 752 to outlet 460, bypassing screen filter 762. According to some embodiments, a strainer 1220 mounted at secondary by-pass port 764 to avoid large particles going back into the subsea machine. Also visible in FIG. 12 is an orifice 1210, which is selected so as to balance the pressure loss of filter 220 with the pressure loss of cooling system 212 (shown in FIGS. 2-3, supra).

While many of the embodiments shown and described thus far have been with respect to filtering barrier fluid used in an electric motor driven subsea system, according to some embodiments, the techniques described herein can be extended to other types of barrier fluid systems. According to some embodiments, the subsea system 130 shown in FIG. 1 is a non-electric subsea system, such as seawater current driven turbine. In this example, a gearbox lubricated with and protected by a barrier fluid can also use a filtration system, such as shown and described herein.

While the subject disclosure is described through the above embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the subject disclosure should not be viewed as limited except by the scope and spirit of the appended claims.

What is claimed is:

1. A subsea system for processing a process fluid comprising:
   an electric motor filled with a barrier fluid that provides lubrication and a barrier between portions of the electric motor and surrounding seawater;
   a rotating fluid processor driven by said electric motor and lubricated by said barrier fluid; and
   a subsea barrier fluid filtration system comprising one or more separation components configured to separate contaminants, including water, from said barrier fluid by circulating a portion of the barrier fluid through the one or more separation components, and wherein the one or more separation components comprises a water coalescer comprising a coalescer media configured to mechanically coalesce water droplets in the barrier fluid and to allow the water droplets to pass through the coalescer media.

2. The system according to claim 1 wherein the contaminants include particles in the barrier fluid.

3. The system according to claim 2 wherein the particles are separated by flowing at least a portion of the barrier fluid through a primary particle filtration medium.

4. The system according to claim 3 wherein said filtration system further comprises one or more bypass conduits configured to allow at least a portion of the barrier fluid to bypass the primary filtration medium.

5. The system according to claim 4 wherein said filtration system further comprises a secondary separation unit configured to provide contaminant separation in cases when said primary filtration medium is partially or completely clogged.

6. The system according to claim 5 wherein said secondary separation unit is configured to separate the contaminants by allowing for gravity collection of condensed water.

7. The system according to claim 5 wherein said secondary separation unit is configured to separate particle contaminants by gravity separation of the particle contaminants.

8. The system according to claim 4 wherein said filtration system is configured to allow greater than 2% of fluid flowing through the filtration system to flow though said one or more bypass conduits even when said primary filtration medium is clean.

9. The system according to claim 4 wherein said filtration system further comprises:
   a secondary particle filtration medium downstream of the primary filtration medium; and
   a second bypass conduit configured to allow at least a portion of the barrier fluid to bypass the secondary filtration medium.

10. The system according to claim 1 wherein the one or more separation components further comprises a water filter unit that includes a water separation membrane configured to block coalesced water droplets from passing through the membrane.

11. The system according to claim 1 wherein the filtration system further comprises a water collection volume configured to store water separated from the barrier fluid.

12. The system according to claim 1 wherein said one or more separation components comprises a magnetic separation unit configured to extract at least magnetically susceptible material from the barrier fluid.

13. The system according to claim 1 wherein the rotating fluid processor is a subsea pump.

14. The system according to claim 1 wherein the rotating fluid processor is a subsea compressor.

15. The system according to claim 1 further comprising a barrier fluid cooling system configured to cool at least a portion of the barrier fluid, said cooling system and said filtration system configured in parallel with each other.

16. A subsea system for processing a process fluid comprising:
   an electric motor filled with a barrier fluid that provides lubrication and a barrier between portions of the electric motor and surrounding seawater;
   a rotating fluid processor driven by said electric motor and lubricated by said barrier fluid; and
   a subsea barrier fluid filtration system comprising one or more separation components configured to separate contaminants, including water, from said barrier fluid by circulating a portion of the barrier fluid through the one or more separation components, and wherein the one or more separation components comprises a water filter unit that includes a water separation membrane configured to block water droplets from passing through the membrane;
   wherein the one or more separation components comprises a water coalescer comprising a coalescer media that is entirely spaced from and positioned upstream of the water separation membrane, the coalescer media being configured to mechanically coalesce the water droplets in the barrier fluid.

17. The system according to claim 16, wherein the filtration system further comprises a water collection volume configured to store water separated from the barrier fluid.

18. The system according to claim 16, wherein the contaminants include particles in the barrier fluid and the particles are separated by flowing at least a portion of the barrier fluid through a primary particle filtration medium.

19. The system according to claim 18, wherein said filtration system further comprises one or more bypass conduits configured to allow at least a portion of the barrier fluid to bypass the primary filtration medium.

20. The system according to claim 19, wherein said filtration system further comprises a secondary separation unit configured to provide contaminant separation in cases when said primary filtration medium is partially or completely clogged.

21. A subsea system for processing a process fluid comprising:
   an electric motor filled with a barrier fluid that provides lubrication and a barrier between portions of the electric motor and surrounding seawater;
   a rotating fluid processor driven by said electric motor and lubricated by said barrier fluid; and
   a subsea barrier fluid filtration system comprising one or more separation components configured to separate contaminants, including water, from said barrier fluid by circulating a portion of the barrier fluid through the one or more separation components, wherein the filtration system further comprises a water collection volume configured to store water separated from the barrier fluid;
   wherein the one or more separation components comprises:
      a water coalescer comprising an annular coalescer media centrally positioned in a casing having a central axis and configured to mechanically coalesce water droplets in the barrier fluid and to allow the water droplets to pass through the coalescer media; and
      a water filter unit comprising an annular water separator membrane centrally positioned in the casing and entirely spaced from the coalescer media along the central axis of the casing, wherein the water separator membrane is configured to block the water droplets from passing through the membrane;

wherein the water collection volume comprises an annular chamber defined by an inner surface of the casing and is configured to receive the water droplets from the water filter unit.

22. The system according to claim 21, wherein the water filter unit is configured to block coalesced water droplets from passing through the membrane.

23. The system according to claim 21, wherein said one or more separation components comprises a magnetic separation unit configured to extract at least magnetically susceptible material from the barrier fluid.

24. The system according to claim 21, wherein the contaminants include particles in the barrier fluid and the particles are separated by flowing at least a portion of the barrier fluid through a primary particle filtration medium.

25. The system according to claim 24, wherein said filtration system further comprises one or more bypass conduits configured to allow at least a portion of the barrier fluid to bypass the primary filtration medium.

* * * * *